United States Patent
Linares

(10) Patent No.: US 8,162,645 B2
(45) Date of Patent: Apr. 24, 2012

(54) APPARATUS FOR FORMING A POLYMER BASED PART UTILIZING AN ASSEMBLEABLE, ROTATABLE AND VIBRATORY INDUCING MOLD EXHIBITING A DOWNWARDLY FACING AND PRE-HEATED TEMPLATE SURFACE

(76) Inventor: Miguel A. Linares, Bloomfield Hills, MI (US)

( * ) Notice: Subject to any disclaimer, the term of this patent is extended or adjusted under 35 U.S.C. 154(b) by 172 days.

(21) Appl. No.: 12/711,760

(22) Filed: Feb. 24, 2010

(65) Prior Publication Data

US 2010/0148388 A1 Jun. 17, 2010

Related U.S. Application Data

(63) Continuation-in-part of application No. 11/326,632, filed on Jan. 6, 2006, now abandoned, which is a continuation-in-part of application No. 10/413,886, filed on Apr. 15, 2003, now abandoned.

(60) Provisional application No. 60/374,771, filed on Apr. 24, 2002, provisional application No. 60/413,139, filed on Sep. 25, 2002.

(51) Int. Cl.
*B28B 7/08* (2006.01)
*B28B 1/08* (2006.01)
(52) U.S. Cl. .................... 425/126.1; 264/69; 264/301
(58) Field of Classification Search .................. 425/102, 425/126.1, 270, 273; 264/69, 301
See application file for complete search history.

(56) References Cited

U.S. PATENT DOCUMENTS

| | | | |
|---|---|---|---|
| 2,058,552 A | 10/1936 | Becher et al. | |
| 2,712,161 A | 7/1955 | Moss | |
| 2,844,489 A | 7/1958 | Gemmer | |
| 2,974,060 A | 3/1961 | Dettling | |
| 3,002,231 A | 10/1961 | Walker et al. | |
| 3,028,251 A | 4/1962 | Nagel | |
| 3,108,022 A | 10/1963 | Church | |
| 3,183,113 A | 5/1965 | Gemmer | |
| 3,254,625 A | 6/1966 | Armstrong | |
| 3,375,310 A | 3/1968 | Koehn | |
| 3,600,753 A | 8/1971 | Otto | |
| 3,679,342 A | 7/1972 | Fougeray et al. | |
| 3,843,296 A | 10/1974 | Sidley et al. | |
| 4,104,416 A | 8/1978 | Parthasarathy et al. | |
| 4,526,804 A | 7/1985 | Escallon | |
| 4,627,998 A | 12/1986 | Akihama et al. | |
| 4,695,241 A | 9/1987 | Ventimiglia | |
| 4,806,388 A | 2/1989 | Mochizuki et al. | |
| 4,971,544 A | 11/1990 | Schneeberger et al. | |

(Continued)

FOREIGN PATENT DOCUMENTS

JP 63283780 11/1988

(Continued)

*Primary Examiner* — Christina Johnson
*Assistant Examiner* — Patrick Butler
(74) *Attorney, Agent, or Firm* — Gifford, Krass, Sprinkle, Anderson & Citkowski, P.C.

(57) ABSTRACT

An apparatus and related method for forming a three-dimensional polymer based part including a die tool having a specified shape and size and exhibiting an exposed polymer adhering surface corresponding in configuration to a polymeric based part to be created. A volume holding bin supports a three-dimensional article including at least one exposed and pattern defining surface. A volume of a granulated polymer material is deposited into the bin and around the article. A sub-volume of the material adheres to and forms a hardened layer upon the exposed pattern defining surface, a corresponding part created having a specified thickness and matching configuration.

3 Claims, 6 Drawing Sheets

U.S. PATENT DOCUMENTS

| | | |
|---|---|---|
| 5,073,329 A | 12/1991 | Carrara et al. |
| 5,118,380 A | 6/1992 | Gatarz et al. |
| 5,483,877 A | 1/1996 | Perego et al. |
| 5,512,615 A | 4/1996 | Olsen |
| 5,612,066 A | 3/1997 | Swenson |
| 5,617,631 A | 4/1997 | Nguyen |
| 5,741,455 A * | 4/1998 | Devanathan et al. ......... 264/319 |
| 6,183,064 B1 | 2/2001 | Murthy et al. |
| 6,318,988 B1 | 11/2001 | Wrobbel et al. |
| 6,589,470 B2 * | 7/2003 | Fried et al. .................... 264/443 |
| 2008/0237940 A1 * | 10/2008 | Jones et al. ................... 264/509 |

FOREIGN PATENT DOCUMENTS

| | | |
|---|---|---|
| JP | 5329441 | 12/1993 |

* cited by examiner

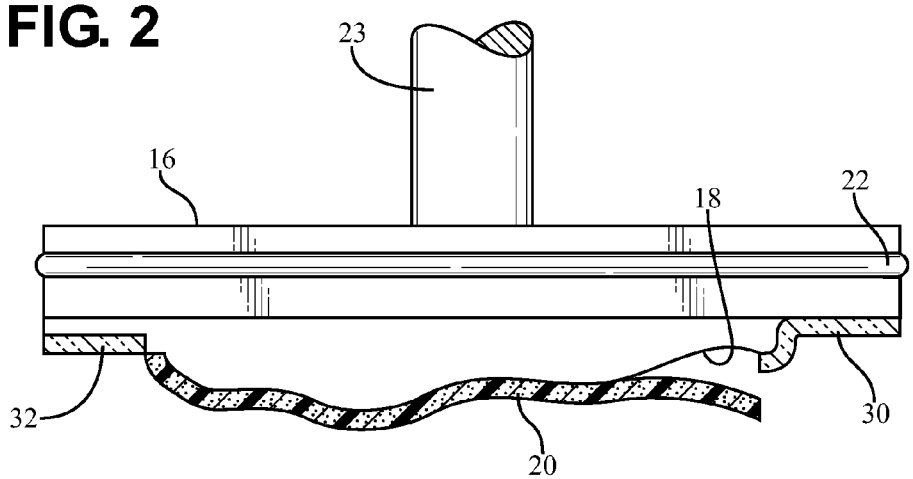
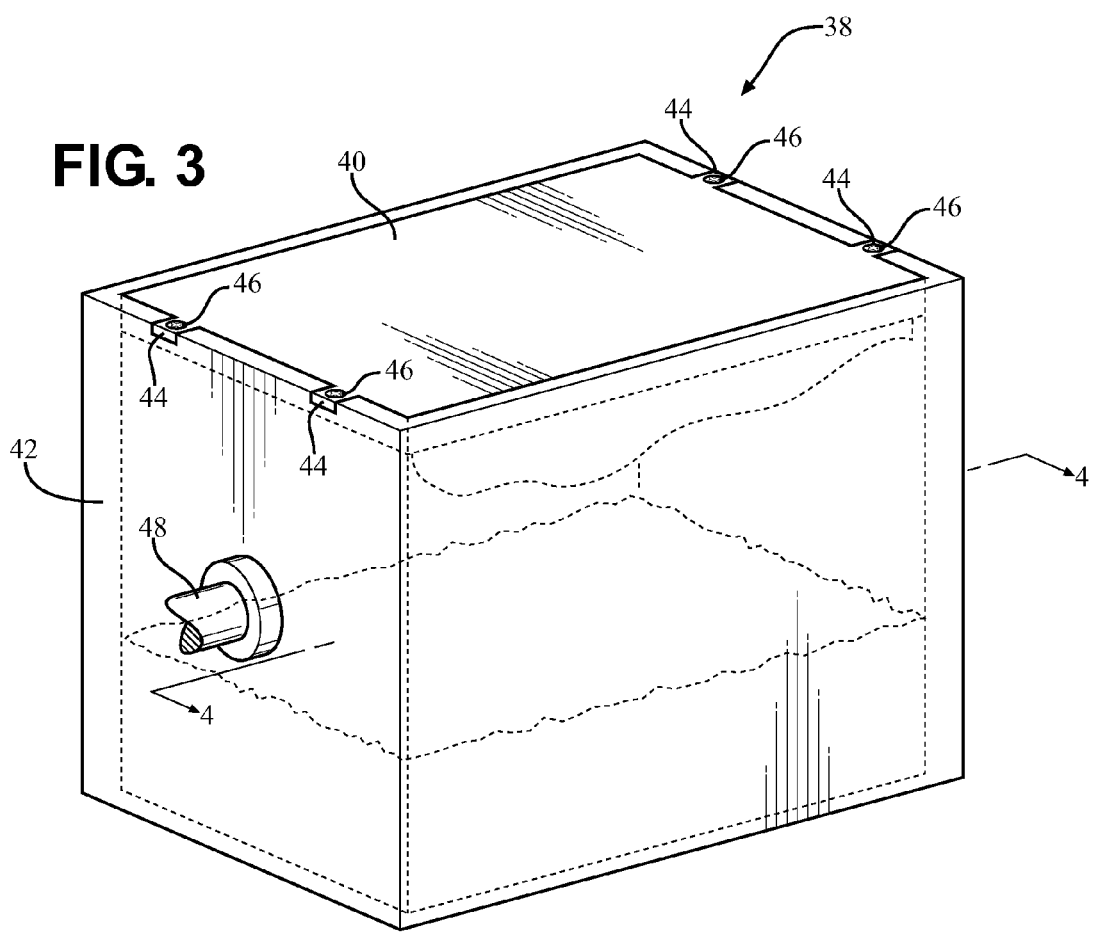

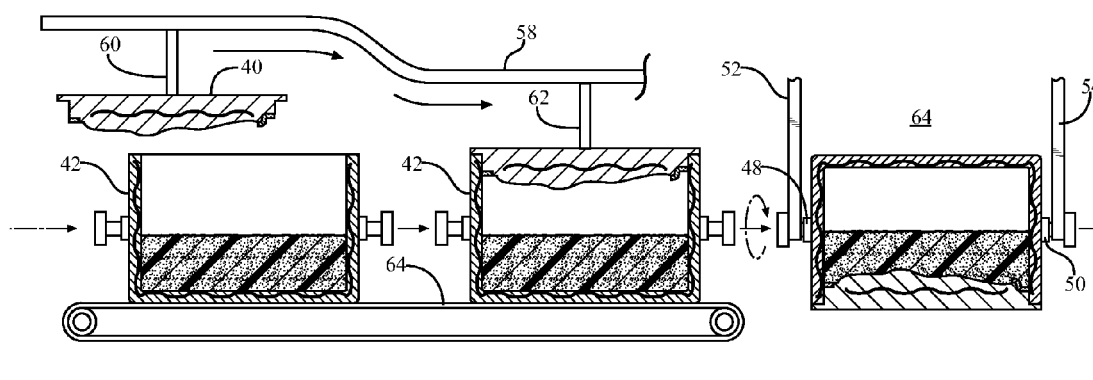
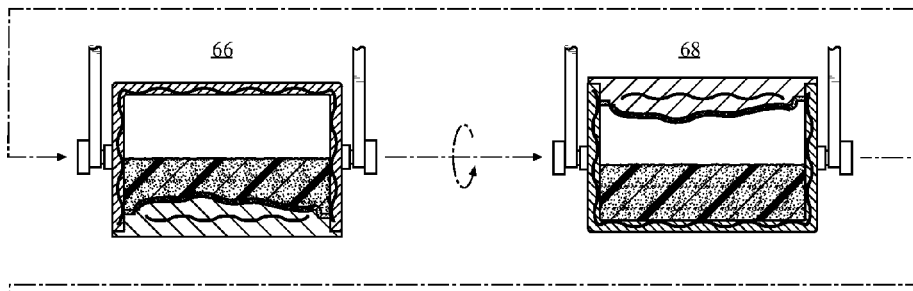
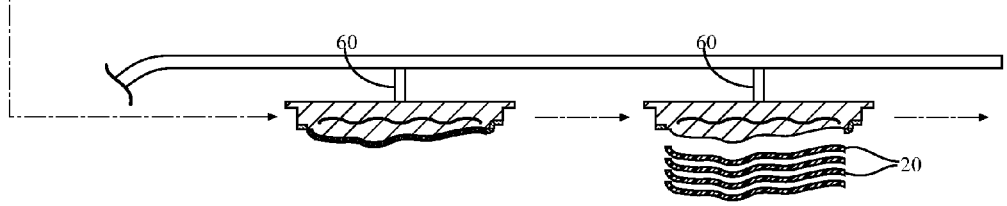
FIG. 8

APPARATUS FOR FORMING A POLYMER BASED PART UTILIZING AN ASSEMBLEABLE, ROTATABLE AND VIBRATORY INDUCING MOLD EXHIBITING A DOWNWARDLY FACING AND PRE-HEATED TEMPLATE SURFACE

CROSS-REFERENCE TO RELATED APPLICATIONS

The present application is a continuation-in-part of patent application Ser. No. 11/326,632, filed Jan. 6, 2006, entitled Particulate Coating Process and Assembly for Use with a Heated Part", which is a continuation-in-part of U.S. patent application Ser. No. 10/413,886, filed Apr. 15, 2003, entitled "Heating and Particulate Drawing Process and Assembly for Aggregating Plasticized Granules in Adhering Fashion to an Exposed Face of a Heated Tool or Part," which in turn claims the priority of U.S. Provisional Application Ser. Nos. 60/374,771, filed Apr. 24, 2002, entitled "Description of Plastic Stamping Process Details for Run Off and Holes of Part," and 60/413,139, filed Sep. 25, 2002, entitled "Heated and Particulate Drawing Process."

FIELD OF THE INVENTION

The present invention discloses a mold, conveyor assembly and process for creating a polymeric part.

BACKGROUND OF THE INVENTION

The prior art is well documented with various examples of article forming assemblies and methods and which in particular incorporate the use of heated and/or compression technology and in which to form a three-dimensional resin based article. The objective in each instance is to create a plasticized/resinous based article in a desired time and cost efficient basis.

Swenson, U.S. Pat. No. 5,612,066 teaches a heat insulating panel for a mold tool for creating a part and including a mold tool assembled to a volume holding powder box. An underside of the mold tool exhibits a panel with exposed upper surfaces against which is applied, melted and adhered a volume of a powder material in order to create a part corresponding to the surface configuration of the mold tool.

SUMMARY OF THE INVENTION

A mold apparatus exhibits, in a first variant, a die exhibiting an underside template surface of a part to be produced exhibits an outline generally matching that of a particulate filled bin. The die is aligned with the open bin and downwardly displaced within its interior in generally perimeter contacting fashion relative the inner walls of the bin, following which the die comes into compressing contacting with the particulate material, the bin being vibrated to encourage move even adherence of polymer to the template surface, following which the die is return upward displaced and the polymeric formed part removed.

In a further variant, the die is formed into an underside facing surface of a lid assembled over the open top of the particle holding bin. The mold is supported in rotatable fashion about a linear extending horizontal axis such that, upon pre-filling the interior with a polymeric material (either powderized and/or fluidic) and assembling the template defining lid, the enclosed mold is capable of being inverted to cause the particulate to melt, set and/or cure in adhering fashion to the heated template surface. Additional features include shaking or vibrating the mold in either the inverted or upright rotated positions in order to evenly apply and subsequently shake loose volumes of polymeric material, and prior to the lid being unfastened and the completed part peeled off.

A related conveyor operated assembly incorporates a plurality of mold assemblies which are successively assembled, cycled, disassembled and rerouted in order to produce in volume a plurality of parts. Upon completion of a desired aggregating/curing step, the bin is inverted, causing any remaining and non-aggregated particulate to be emptied, and such as upon a reconveying line for resupply to a hopper feed for reintroduction in a subsequent part forming operation. The exposed and aggregated part is finally removed from the tool surface and finished according to any known trimming process. The plastic (thermoplastic) part formed upon the die tool is capable of being removed, such as by peeling off, when in the green or thermo-reacting stage and during which it is still flexible and easy to bend.

Also disclosed is a method of forming a three-dimensional polymer coating including the steps of pre-filling the base interior with a polymeric material (either powderized and/or fluidic), assembling the template defining lid, heating the polymeric material, and inverting the mold to cause the particulate to melt, set and/or cure in adhering fashion to the heated template surface. Additional features again include shaking or vibrating the mold in either the inverted or upright rotated positions in order to evenly apply and subsequently shake loose volumes of polymeric material, and prior to the lid being unfastened and the completed part peeled off.

Yet additional steps include adhering/curing, in a temperature and time based fashion, a desired volume and thickness of particulate to the tool surface, inverting the bin to expel remaining and non-aggregated amounts of particulate and, finally, peeling away the completed and hardening part created thereby. Additional steps include applying a ceramic coating about an extending perimeter of the adhering surface of the tool and/or about at least one aperture defined in the die tool, and in order to prevent aggregating of material thereto.

BRIEF DESCRIPTION OF THE DRAWINGS

Reference will now be made to the attached drawings, when read in combination with the following detailed description, wherein like reference numerals refer to like parts throughout the several views, and in which:

FIG. 2 is a succeeding view illustrating return upward displacement of the die and subsequent removal of the polymeric formed part;

FIG. 3 is a perspective view of an assembleable mold according to a further variant of the present invention and in which the die is formed into an underside facing surface of a lid assembled over the open top of the particle holding bin;

FIG. 8 is an illustration of a conveyor system related conveyor operated assembly incorporating a plurality of mold assemblies which are successively assembled, cycled, disassembled and rerouted in order to produce in volume a plurality of parts.

DETAILED DESCRIPTION OF THE PREFERRED EMBODIMENTS

Figure 1:
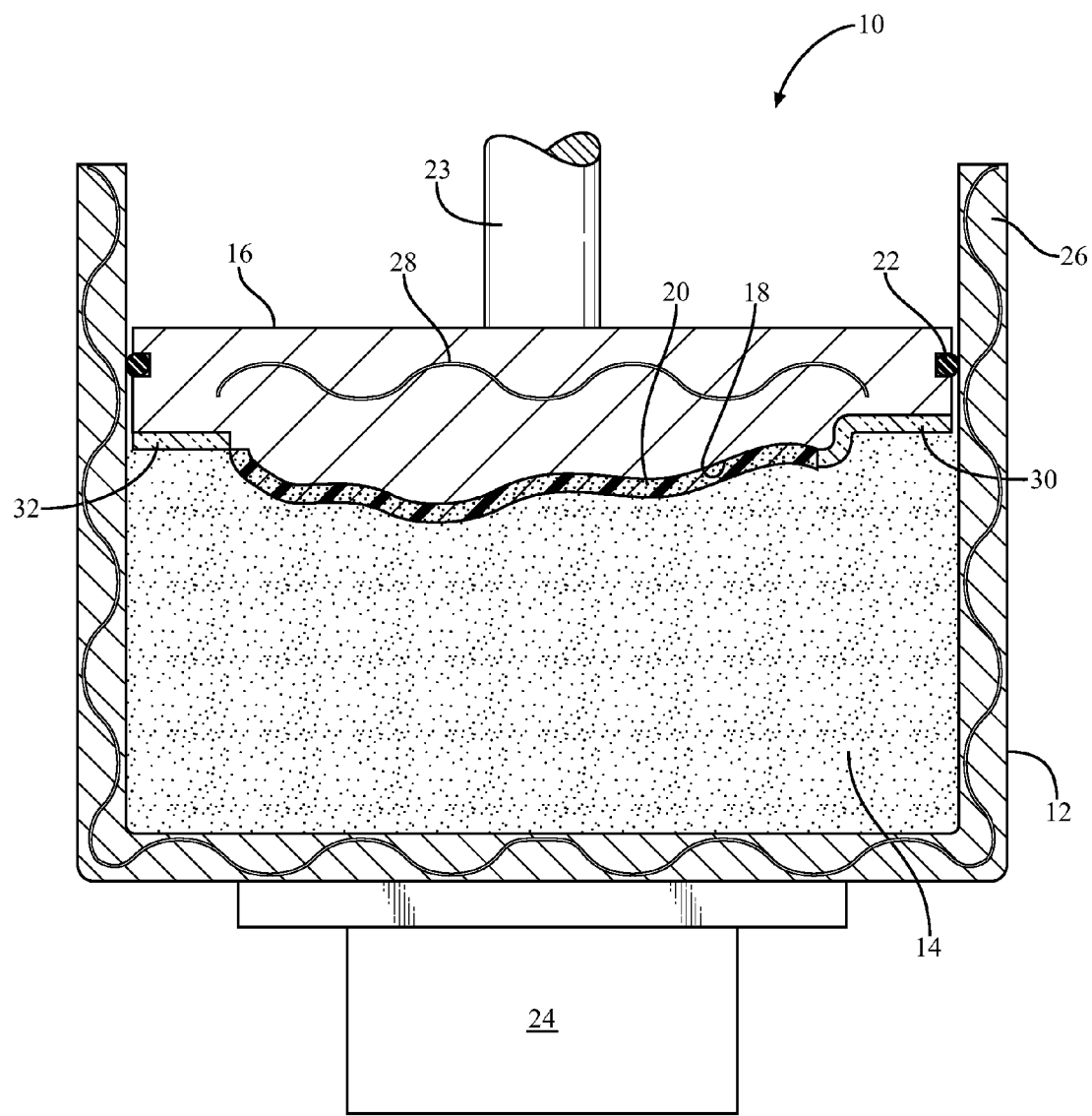
FIG. 1 is a side cutaway view of a mold assembly according an embodiment of the invention and in which a die exhibiting an underside template surface of a part to be produced exhibits an outline generally matching that of a particulate filled bin and which is downwardly displaced in generally perimeter contacting fashion relative the inner walls of the bin in compressing contacting with the particulate material, the bin being vibrated to encourage move even adherence of polymer to the template surface.

Referring now to the drawing figures, and initially to FIGS. 1-2, a tool assembly is generally illustrated in cutaway at 10 according to a first preferred embodiment of the present invention for creating a polymer or plasticized three-dimensional part is formed.

As will be subsequently described, the present invention renders possible the creation of a desired part according to any desired thickness and such as directed to an automotive or other suitable application and which can further exhibit any type of polymeric, polymer resin or other mixed composition such as which can also include the admixture of any type of finely ground aggregate additive.

FIG. 1 is a side cutaway view of the mold assembly according an embodiment of the invention and including a bin 12 having a plurality of enclosed sides defining an open interior which is filled with a volume of the particulate material 14. A die 16 exhibits an underside template surface 18 which generally corresponds to a negative of a part to be produced (see further as depicted at 20 in each of FIGS. 1 and 2). The die 16 includes a perimeter edge exhibiting a general gasket or other type seal 22, this generally contacting in a minimally frictionally and sealing fashion with the inner facing surfaces of the walls corresponding to the particulate filled bin 12.

As further illustrated, the die is downwardly displaced in generally perimeter contacting fashion relative the inner walls of the bin 12, such as via a supporting shaft 23 to which the die 16 is secured, until coming into compressing contact with the particulate material 14. At this point, the bin 12 is vibrated, such as by an underside platform supporting oscillating element representatively depicted at 24, and in order to encourage even adherence and distribution of polymer 14 across the template surface 18. Concurrent with vibrating, the die 16 can be continuously or incrementally compressed against the surface of the polymeric material 14 according to any desired technique, this in order to encourage faster and more even polymeric buildup. As further shown in FIG. 2, return upward displacement of the die 16 occurs following a desired cure period, with subsequent removal of the polymeric formed part 20.

The die 16 with template underside surface 18 is heated, such as by a suitable beat conducting (e.g. electrical) assembly incorporated into the bin and article 14, and which is represented in FIG. 1 by electrical resistance coils shown at 26 and 28 embedded within the bin 12 and die 16. In the preferred application, it is desired that the heat emanate from the exposed and metallic tool surfaces (again typically a polished metal surface) and so that it provides a neat and localized area for initiating aggregation of localized plasticized resin particles, as will be subsequently described. Is it also envisioned that, in addition to heating the exposed article defining surface 18, the exterior walls of the bin may also include the heating coils or filaments (again at 26) in order to conduct/convect a desired amount of heat to the particle filled interior of the bin, such as to melt or otherwise improve the flow-ability of the polymeric material 14 and to facilitate subsequent adherence of volumes of particulate to the exposed template surfaces 18.

Insulated portions 30 and 32 are arranged at specified locations of the tool pattern and in order to define areas to which heated and aggregating plastic does not adhere. It is also contemplated that the location and configuration of the insulating portions can be modified, along with a given adhering pattern surface, and in order to create differently configured parts (further reference being had to FIG. 7 which illustrates an example of a part 20' with central apertures corresponding to at least one ceramic plug (see at 34 and 36 in the die configuration depicted in FIG. 6), the plugs being secured such as to one or more apertures formed in the template surface, this in order to provide a localized non-adhering area within an otherwise adhering surface portion of the template defined and part forming surface. Additionally, and although not shown, it is understood that a variety of differently shaped sculpted patterns, not shown, can be secured within the bin interior and in order to create a likewise variety of differently shaped parts according to the desires of the user.

The plasticized or polymeric article thus created can include such other applications as a plastic shingle, for homes, plastic siding, shower units, Jacuzzi units, swimming pool parts, and hollow panels filled with different materials used in such as third world housing constructions. Other and additional uses of the three-dimensional parts thus created may include, without limitation, such as those as for use in recreation land and sea vehicles.

The bin 12 interior, as will be additionally described in the several succeeding illustrations, is filled with a volume of the plasticized (blank) material in particulate form, again at 14 and includes such as a high polymer or like synthetic material, which exhibits desired thermoplastic properties. It is also contemplated other types of polymers, polymeric based resins, and the like may also be employed within the scope of the invention and by which a desired three-dimensional quantity of such material in particulate form is caused to aggregate and to adhere to the exposed and attracting surface 16 of the die tool. Additionally, other types of synthetic resins, such further including thermoset resins, can be employed within the scope of the invention and in order to create the desired part from both a structural and material content perspective.

It is contemplated in one embodiment that the particulate adhering surfaces 18 associated with the underside part forming template pattern 18 are preheated to a temperature (such as in a range of 300° F. to 500° F.), while the surrounding ceramic/insulating surfaces, e.g. again at 30 and 32, only elevate to a temperature in the range of 100° F. Additionally, and if desired, the particles 14 may be preheated prior to introduction into the bin interior (such to or just below the melting temperature), this in order to facilitate aggregation and formation of a desired thickness and consistency upon the tool surface.

Figure 6:
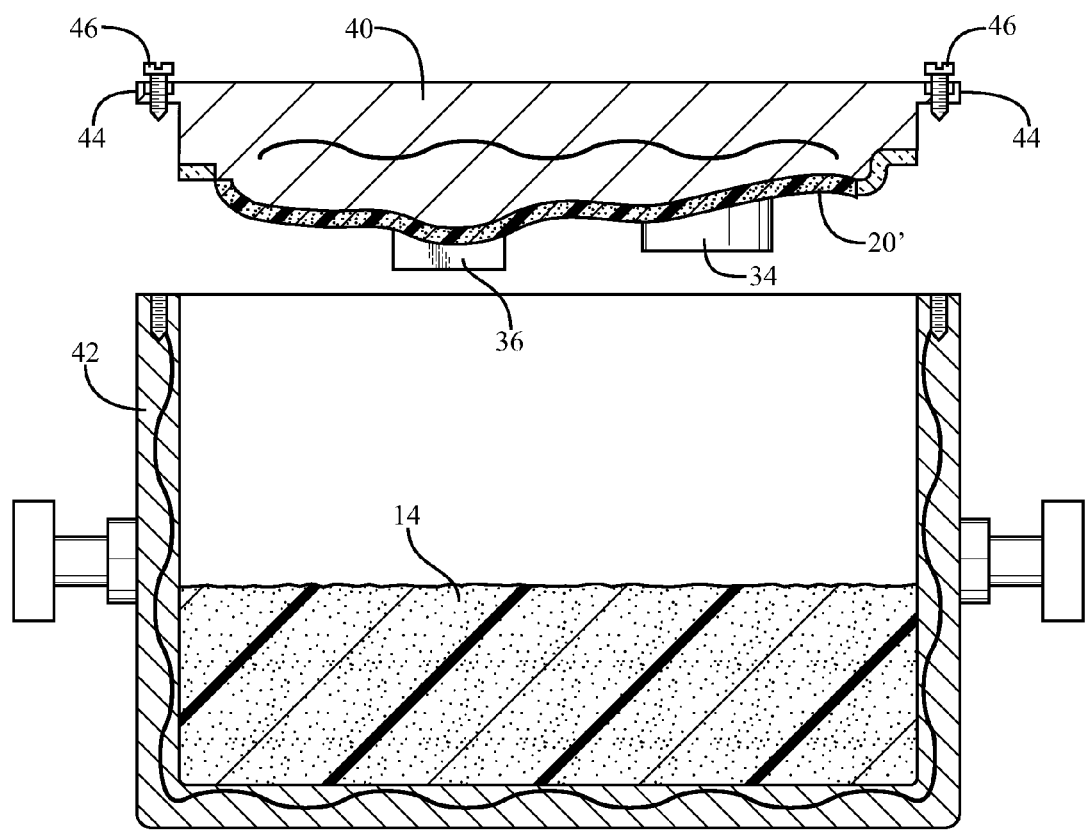
FIG. 6 is a further succeeding view in which the mold is re-rotated to its upright position, following which the lid is removed in order to reveal the finished/cured part.
Figure 7:
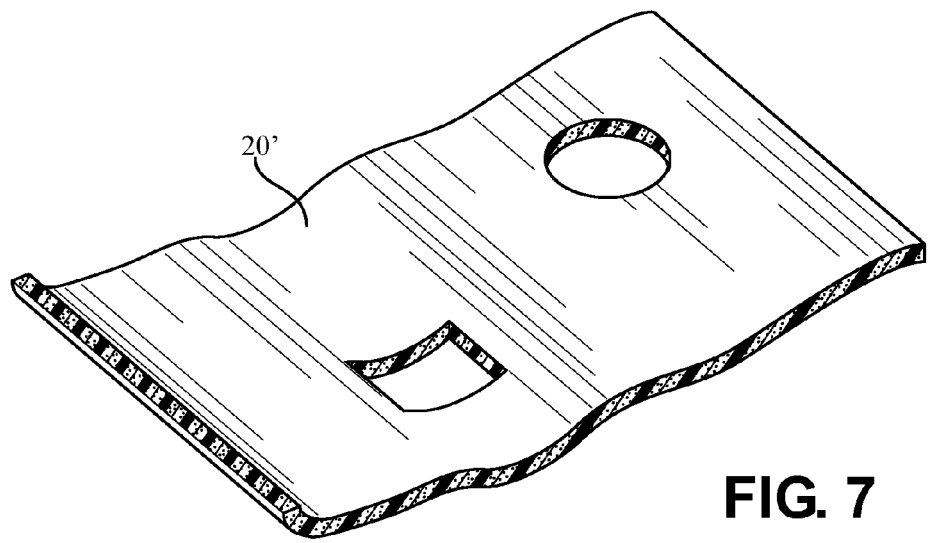
FIG. 7 is an illustration of a representative polymeric part constructed according to the invention.

Referring now to FIG. 3, is a perspective view is generally shown at 38 of an assembleable mold according to a further variant of the present invention and in which a modified die is formed as an underside facing surface of a lid 40 assembled over an open top of the particle holding bin 42 via configured edge engagement portions 44 and associated fasteners 46 (see in particular FIGS. 3 and 6). The remaining features depicted in the variant of FIGS. 1 and 2 are likewise included in this variant of FIG. 3, these again including the provision of heating coils or the like for evenly heating the surface of the template surface of the die tool.

Figure 5:
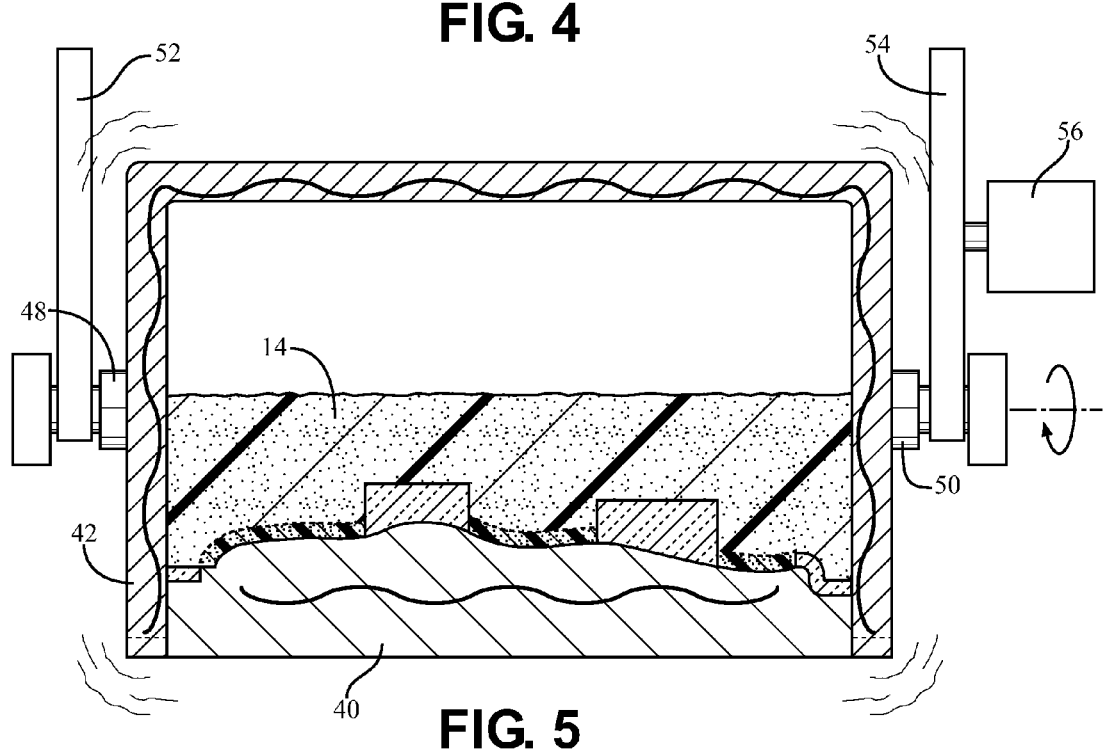
FIG. 5 is a succeeding view in which the bin is inverted about a linear extending horizontal axis and so that the particulate is caused to contact and subsequently adhere to the surface of the part template.

A carriage mechanism, see as represented by bin extending end surface portions 48 and 50 intended to provide for rotates the bin and assembly about a linear horizontal axis. As best shown in FIG. 5, the carriage support structure includes a pair of arms 52 and 54, or other suitable engaging structure as known, and which is designed to releasably engage the end projecting portions 48 and 50 in rotationally permissive fashion. As further shown, the carriage mechanism may also include a vibratory inducing component, at 56, for shaking or vibrating the bin and which can be accomplished during or following pivoting rotation of the bin.

Figure 4:
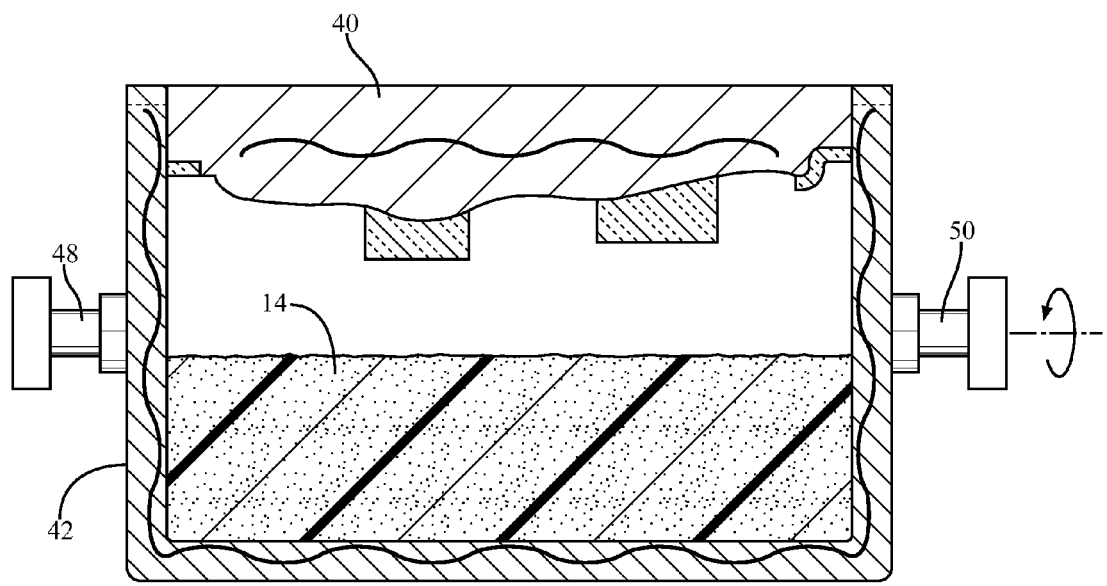
FIG. 4 is a cutaway taken along line 4-4 of FIG. 3 and showing the bin with a prefilled particulate and an assembled top with downwardly facing part defining template pattern.

In operation, referring to FIG. 4, the bin 42 is shown with a prefilled particulate and with the assembled lid 40 with downwardly facing part defining/forming template pattern. As further shown in FIG. 5, the bin 42 is successively inverted about the linear extending horizontal axis established by the carriage supports 48 and 50, and so that the particulate 14 is caused to contact and subsequently adhere to the surface of the now inverted part template 40 due to both the effects of gravity and the associated forces exerted by the overall volume of polymeric material against the lowermost polymeric layer in contact with the heated template.

At this point, the bin is vibrated to facilitate at least one of part formation and removal of non-adhering volumes of polymer particulate. Referring further to FIG. 6, and following conclusion of the formation stage for determining the part thickness, the mold assembly (including bin and attached lid with underside facing die) is re-rotated to its initial upright position, following which the lid is removed in order to reveal the finished/cured part, again depicted at 20' as previously described with pre-located ceramic plugs 34 and 36 for designing in desired apertures of the polymeric part (see again FIG. 7).

Figure 8A:
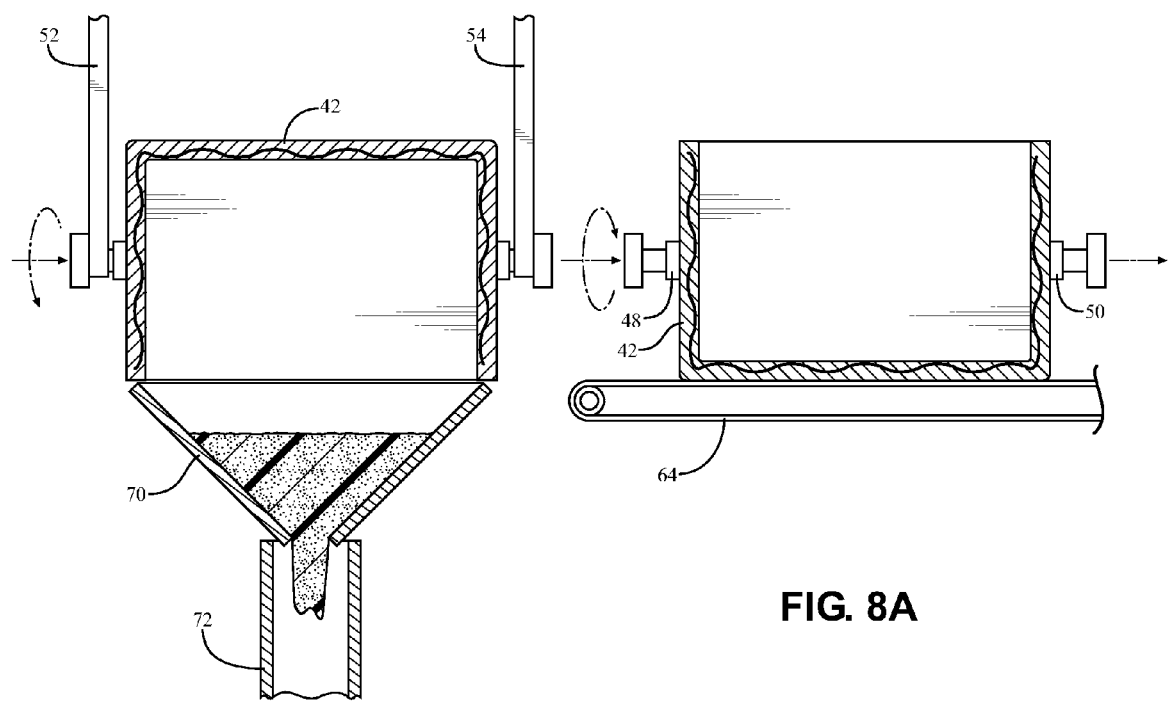
FIG. 8A is a succeeding illustration to FIG. 8 and illustrating, upon completion of a desired aggregating/curing step, a succession of bins re-inverted in order to empty any remaining and non-aggregated particulate to be emptied, following which the bins are placed upon a re-conveying line for resupply to a hopper feed for reintroduction in a subsequent part forming operation.

Referring finally to FIGS. 8 and 8A, a pair of illustrations are shown of a related conveyor operated assembly incorporating a plurality of mold assemblies which are successively assembled, cycled, disassembled and rerouted in order to produce in volume a plurality of parts. A first overhead extending conveyor 58 includes a plurality of support rods 60, 62, et seq., which support a succession of lids 40 as previously described, each again exhibiting on an underside facing interior surface a negative template of a part to be produced. A second conveyor 64 supports a succession of volume holding bins 42 within each of which are deposited a volume of a polymeric material and over which is assembled a selected lid. The second conveyor can be combined with a subsequent carriage mechanism, again referenced by arms 52 and 54 engaging the bin end rotatably supporting portions 48 and 50, such as into a single interfacing transfer mechanism associated with the bins.

It is understood that the support rods 60, 62 can releasably deposit the lids 40 onto the bins 42 (such as for being mechanically fastened or magnetically adhered in place by interfacing and attracting magnets of the like). It is also understood that the compressing shaft 23 illustrated in the variant of FIG. 1 can designed to form a component of the overhead conveyor 58 and, in combination with redesigned aspects of the second conveyor 64 and carriage mechanisms, can provide for continuous part formation utilizing the assembly otherwise depicted in FIG. 1.

As further illustrated, the carriage mechanism is engaged (at location 64) pivotally supports each bin 42 about a linear horizontal axis and subsequently inverts (at location 66) the bin in a first step (see also again FIG. 5) to adhere a sub-volume of a polymeric material according to a desired thickness to the template defined surface. The carriage subsequently return rotates the bin (location 68) to an upright position, and further exerts a vibratory motion to the bin during at least one of the inverted and return rotated positions to facilitate at least one of particulate adherence during part formation and excess polymeric removal, and prior to disassembly of the lid 40 (or controlled retraction of the die 16) and removal of the finished part 20.

FIG. 8A is a succeeding illustration to FIG. 8 and illustrating, upon completion of a desired aggregating/curing step and removal of the lid/retraction of the die, a succeeding step in which the carriage mechanism (arms 52 and 54) successively re-invert each of the bins 42 in order to empty any remaining and non-aggregated particulate into a collection hopper 70. The hopper 70 is in turn communicated with a resupply line 72 in order to redirect unused polymeric material for reintroduction in a subsequent part forming operation. Following this, each bin 42 is replaced upon a delivery location of the conveyor 64 (or alternately is retained by the carriage supporting arms for subsequent delivery to a succeeding lid assembly step).

Finally, a method of forming a three-dimensional polymer part is provided and includes the steps of pre-filling a bin with a polymeric material exhibiting at least one of a powderized or fluidic stage, covering the bin with a die exhibiting a template defined underside surface corresponding to a part to be produced, heating at least one of the bin, lid and polymeric material, contacting the template surface with the polymeric material in combination with vibrating the bin in order to promote even distribution of adhering polymer, curing a part formed upon the die template surface, and removing the die and subsequently said cured part.

Additional method steps include downwardly displacing the die within an interior of the bin, such that the underside template surface establishes compressing contacting with the polymeric material. Also included are the steps of fastening the die to the bin, inverting the bin in a first part forming operation and returning the bin in a final part removal operation.

In a preferred variant, a material thickness of a thermoplastic formed part may exhibit a range of between 0.125" to 0.500", however any desired thickness of part can be achieved utilizing the techniques described herein, it is again understood that the desired three-dimensional buildup of polymer material upon the die tool is a variable of the preheated temperature of the tool adhering surfaces, as well as potentially that of the particulate bin, and the time period during which the die tool is embedded within the particulate volume filling the bin. Along these lines, parts exhibiting other thicknesses, as well as material properties, can be constructed by altering the temperatures, material content or setting time of the volume of particulate within the bin, all within the scope of one skilled in the art.

Having described my invention, other and additional preferred embodiments will become apparent to those skilled in the art to which it pertains, and without deviating from the scope of the appended claims:

I claim:

1. A conveyor assembly incorporating a plurality of individually assembleable molds for creating polymer based parts, comprising:

a first overhead extending conveyor supporting a succession of lids via a plurality of support rods, each exhibiting on an underside facing interior surface a negative template of a part to be produced;

a second conveyor supporting a succession of volume holding bins within which are deposited a volume of a polymeric material and over which is assembled a selected lid; and a carriage mechanism including a pair of spaced apart arms configured and lower extending ends for engaging a pair of coaxially aligned and bin end rotatably supporting portions for pivotally supporting said bin about a linear horizontal axis, said carriage mechanism constructed to withdraw said assembled lid and bin from said second conveyor prior to inverting said assembled lid and bin in a first step to adhere a sub-volume of a polymeric material according to a desired thickness to said template, said carriage return rotating said bin to an upright position, said carriage further exerting a vibratory motion to said bin during at least one of said inverted and return rotated positions to facilitate at least one of particulate adherence during part formation and excess polymeric removal, and prior to disassembly of said lid and removal of the finished part.

2. The conveyor assembly as described in claim 1, further comprising said second conveyor and carriage mechanism being combined into a single interfacing transfer mechanism associated with said bins.

3. The conveyor assembly as described in claim 1, further comprising a collection hopper communicated with each of said bins in an inverted position and in order to redirect unused polymeric material for reintroduction in a subsequent part forming operation.

* * * * *